United States Patent [19]
Vile et al.

[11] 4,303,965
[45] Dec. 1, 1981

[54] SINGLE-MODE VEHICULAR HEADLAMP SYSTEM

[75] Inventors: Robert L. Vile, Glen Ridge; Elam Pitkjaan, Cedar Grove, both of N.J.

[73] Assignee: Westinghouse Electric Corp., Pittsburgh, Pa.

[21] Appl. No.: 127,616

[22] Filed: Mar. 6, 1980

Related U.S. Application Data

[63] Continuation-in-part of Ser. No. 951,825, Oct. 16, 1978.

[51] Int. Cl.³ .......... B60Q 1/00; F21M 3/12

[52] U.S. Cl. .......... 362/61; 362/309; 362/338

[58] Field of Search .......... 362/61, 308–309, 362/327–329, 331, 336, 338; 313/313, 317; 315/82–83

[56] References Cited

U.S. PATENT DOCUMENTS

| | | | |
|---|---|---|---|
| 1,338,675 | 5/1920 | Churchill | 362/309 |
| 3,102,692 | 9/1963 | Einerman | 362/61 |
| 3,219,809 | 11/1965 | Bulic | 362/236 |
| 3,373,311 | 3/1968 | Neulinger | 315/83 |
| 3,617,795 | 11/1971 | Peek | 313/117 |
| 3,688,147 | 8/1972 | Pitkjaan | 313/113 X |
| 3,818,210 | 6/1974 | Pitkjaan | 362/61 |

*Primary Examiner*—L. T. Hix
*Assistant Examiner*—Thomas H. Tarcza
*Attorney, Agent, or Firm*—D. S. Buleza

[57] ABSTRACT

A single pair of headlamps that each contain a single on-focus light source and produce different but complementary beam patterns are mounted on a motor vehicle to provide a composite beam of intense non-glare light that is used for city, rural and turnpike driving and thus remains "fixed" and constant for all driving conditions. The use of a single light source in each headlamp improves the optical efficiency of the lighting system and provides both long range and short range illumination of the roadway with a minimum amount of energy and drain on the electrical system of the vehicle. The headlamps are not interchangeable and must be mounted in proper relationship on the vehicle to provide the single-mode illumination. However, they can be of circular or rectangular shape and have reflector and lens components that are preferably hermetically sealed to one another to provide sealed-beam type lamps, or which can be separated and thus form housings that can be opened to permit the light sources to be removed and replaced. When the headlamps are of sealed-beam construction, a coiled wire filament or a compact halogen-cycle type incandescent lamp can be used as the light source. Standard compact incandescent lamps or halogen-cycle incandescent lamps are employed in headlamps that are not hermetically sealed. Reflector components of dual-segment construction can also be used to obtain beam patterns having the proper characteristics.

17 Claims, 18 Drawing Figures

PROTOTYPE LENS FOR LEFT LAMP

PROTOTYPE LENS FOR RIGHT LAMP

MODIFIED PROTOTYPE LENS FOR LEFT LAMP

MODIFIED PROTOTYPE LENS FOR RIGHT LAMP

SINGLE-MODE VEHICULAR HEADLAMP SYSTEM

CROSS-REFERENCE TO RELATED APPLICATIONS

This application is a continuation-in-part of application Ser. No. 951,825 filed Oct. 16, 1978.

BACKGROUND OF THE INVENTION

1. Field of the Invention

This invention relates to the roadway illuminating art and has particular reference to an improved headlamp system for a motor vehicle.

2. Description of the Prior Art

In an effort to provide maximum illumination of the roadway under various driving conditions without "blinding" the drivers of other vehicles, the automotive industry has traditionally employed a dual-mode headlamp system that provides "low beam" and "high beam" lighting patterns. The "low beam" mode of illumination is used for city driving and on highways where other cars are present, and the "high-beam" mode for driving in rural areas and on turnpikes where glare light is not a problem or does not constitute a safety hazard. Such headlamp systems conventionally employ either two or four headlamps that are selectively energized by suitable switch means in the vehicle to provide the desired high-beam or low-beam modes of illumination. Headlamp systems of both types are well known to those in the art and are presently in use on motor vehicles manufactured in this country and abroad.

A dual-headlamp automotive lighting system having switch means and lamps with light-gate-lens assemblies which permit the lamps to be operated in two or three different lighting modes is disclosed in U.S. Pat. No. 3,617,795 (Peek). Road-lighting systems for vehicles which include four headlamps that are selectively energized to provide low-beam, high-beam and turnpike-beam modes of illumination are described in U.S. Pat. Nos. 3,373,311 (Neulinger et al.) and 3,818,210 (Pitkjaan). A tri-beam roadway-lighting system for motor vehicles which employs four headlamps that provide low-beam, mid-beam and high-beam lighting modes is disclosed in U.S. Pat. No. 3,894,227 (Pitkjaan et al).

Dual-headlamp systems for vehicles having headlamps with various combinations of lens components, baffles and light sources which reduce glare by shifting light rays from one quadrant to another to form overlapping beams, that concentrate the light rays in conical-shaped beams, or which control the light rays with an elongated housing that is fitted with a grooved lens are disclosed in U.S. Pat. Nos. 1,338,675 granted to Churchill; 3,102,692 granted to Einerman and 3,219,809 granted to Bulic.

SUMMARY OF THE INVENTION

While the prior art headlighting systems were generally satisfactory from a functional standpoint in that they reduced glare light and permitted the driver of the vehicle to change the beam pattern and light intensity in accordance with driving conditions, they were rather expensive and complicated and required large power inputs which placed a heavy burden on the vehicle's electrical system and thus reduced the overall efficiency of the vehicle. More importantly, the beam patterns provided by such headlamp systems did not provide adequate illumination along the edges of the driving lane with the result that left-hand and right-hand turns were difficult to make and sometimes hazardous. The constant need to switch from one lighting mode or beam pattern to another while driving (in order to prevent blinding the drivers of other vehicles) constitutes another serious problem with the prior art headlamp systems since it places an additional burden on the driver and frequently creates hazardous situations when a driver either forgets to switch his headlamps from high-beam to low-beam or deliberately keeps them on high-beam in order to see far enough ahead when driving on a strange road at high speeds.

The foregoing disadvantages and objections to the prior art headlamp systems are remedied in accordance with the present invention by utilizing a single pair of headlamps that each contain a single "on-focus" light source and have reflector and lens components which produce a composite beam pattern and a single mode of illumination that is used for all driving conditions and all types of roads and traffic. The individual headlamps are so designed that their beam patterns are different from one another but complement each other in such a way that they project both long range and short range high-intensity light down the roadway in front of the vehicle, as well as "fill-in" light between the two beams and peripheral "tails" of light which illuminate both sides or shoulders of the road—without blinding the drivers of other vehicles that are in the vicinity. The headlamps are thus not interchangeable and must be mounted in the proper relationship on the front of the vehicle. Since only a single light source (such as a coiled filament or a compact tungsten-halogen incandescent lamp) is used in each headlamp, it is efficiently coupled with its reflector component from an optical standpoint and produces the required beam intensity as well as supplemental light in critical areas of the roadway at lower power inputs—thus conserving energy and providing safer roadway illumination.

BRIEF DESCRIPTION OF THE DRAWINGS

A better understanding of the invention will be obtained from the following exemplary embodiments shown in the accompanying drawings, wherein.

DESCRIPTION OF THE PRIOR ART HEADLAMP SYSTEMS (FIGS. 1-4)

Before describing the improved headlamp system of the present invention, a brief review of the prior art systems currently in use will provide useful background information and a better understanding of the novel and advantageous features of the improved system.

Figure 1:
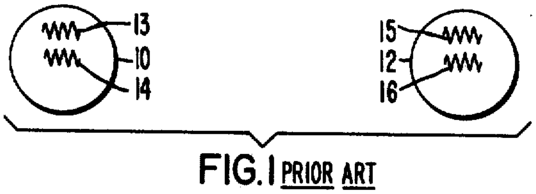
FIG.1 PRIOR ART
FIG. 1 is a schematic representation of a conventional dual-headlamp system presently being used on various kinds of vehicles.

One of the common headlamp systems presently in use in the automotive and truck industry is shown in FIG. 1 and consists of a pair of headlamps 10, 12 that each contain a pair of light sources such as coiled filaments 13, 14 and 15, 16, respectively, and have the usual lenses and parabolic reflectors (not shown). Filaments 14 and 16 constitute the low-beam light sources and are positioned on the focal points of the respective reflector components of headlamps 10 and 12. The remaining filaments 13 and 15 are the high-beam filaments and are located off-focus and generally above the low-beam filaments, as illustrated. Low-beam lighting for city driving and in high density traffic is obtained by energizing both of the low-beam filaments 14 and 16. High-beam illumination for rural or turnpike driving is obtained by switching off the low-beam filaments and energizing both high-beam filaments 13 and 15. The headlamps 10, 12 are thus identical and are interchangeable.

Figure 2:
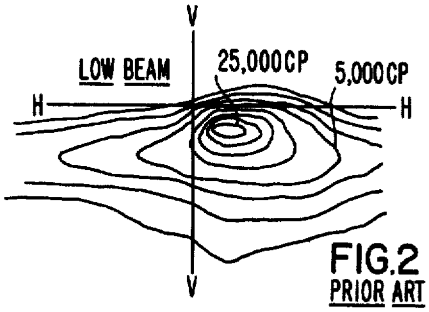
FIG.2 PRIOR ART
FIGS. 2 and 2A are isocandle diagrams illustrating the low-beam and high-beam patterns produced by the dual-filament headlamps employed in the prior art system shown in FIG. 1.

The low-beam pattern produced by each of the headlamps 10 and 12 is shown in FIG. 2 and, as will be noted, provides a small central zone of maximum light intensity in the order of around 25,000 candlepower (cp) that is located below the horizontal axis H—H of the lamp and slightly to the right of its vertical axis V—V. The light intensity progressively decreases outwardly from this central "hot spot" zone with the light being concentrated near the horizontal axis and to the right of the vertical axis, as indicated by the fifth zone of light (approximately 5,000 cp) which is located in the lower righthand quadrant and only extends slightly beyond the vertical axis but not above the horizontal axis. The composite low-beam illumination provided by the combined low-beam patterns of both headlamps 10, 12 is thus directed to the right side of the driving lane (away from opposing traffic) and is sharply cut off slightly above the horizontal.

Figure 2A:
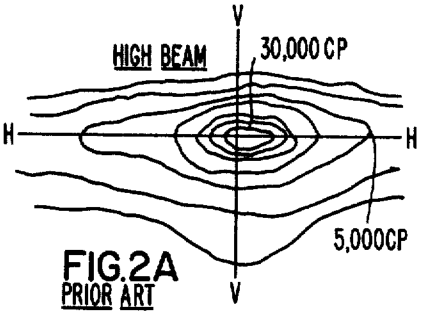
FIG.2A PRIOR ART

In contrast, the high-beam pattern (FIG. 2A) provided by each of the conventional headlamps 10, 12 of the prior art dual-lamp system of FIG. 1 is almost exactly centered on the intersection of the vertical and horizontal axes of the lamp and thus provides a concentrated zone of high intensity light (in the order of about 30,000 cp) that is aimed directly down the road in front of the vehicle. The zones of decreased light intensity spread laterally outwardly in both directions from the central zone, as indicated by the fifth light zone (approximately 5,000 cp) that is elongated and more elliptical but centered along the horizontal axis H—H of the headlamp.

The aforementioned intensities for the low-beam and high-beam patterns produced by a conventional dual-headlamp system (FIG. 1) are typical and require sealed beam filament-type headlamps that have a nominal rating of 12 volts and approximately 60 watts for the low-beam filament, and about 50 watts for the high-beam filament. The total wattage for the system is, accordingly, approximately 120 watts when in the low-beam mode and approximately 100 watts when in the high-beam mode.

Figure 3:
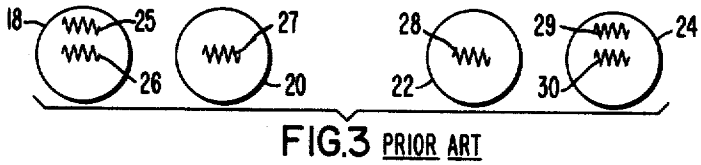
FIG.3 PRIOR ART
FIG. 3 is a schematic representation of a conventional four-headlamp system which is also in current use on motor vehicles.

A conventional four-headlamp system that is also in use is shown in FIG. 3 and employs two pairs of headlamps 18, 20 and 22, 24 that are located on opposite sides of the vehicle. The outboard lamps 18 and 24 each contain an on-focus low-beam filament 26 and 30, respectively, and an off-focus high-beam filament 25 and 29, respectively. The inboard headlamps 20 and 22 are high-beam lamps that each contain a single filament 27 and 28, respectively, that are located at the focal points of the parabolic reflectors. Low-beam illumination is obtained by energizing the two low-beam on-focus filaments 26 and 30 in the outboard lamps. High-beam illumination is obtained by switching the outboard lamps from the low-beam filaments to the two off-focus filaments 25, 29 and simultaneously energizing the on-focus filaments 27, 28 of the inboard lamps 20 and 22, respectively. Hence, in the low-beam mode only the two outboard lamps are in operation and all four headlamps are energized to provide the high-beam mode. Once again, headlamps 18 and 24 (the outboard lamps) are identical and can be interchanged. The same is true of the two inboard lamps 20, 22.

Figure 4:
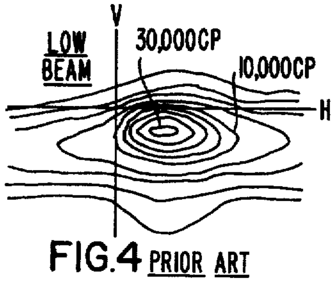
FIG.4 PRIOR ART
FIGS. 4, 4A and 4B are isocandle diagrams illustrating the low-beam and two high-beam patterns produced by the various lamps of the prior art four-headlamp system shown in FIG. 3.

As illustrated in FIG. 4, the low-beam pattern produced by each of the outboard lamps 18, 24 is quite similar to that produced by the low-beam filaments of the prior art dual-headlamp system, except that the light is more concentrated and more uniformly distributed around the central zone below the horizontal axis H—H of the lamp while still confined mainly to the right of the vertical axis V—V. The central light zone typically has an intensity of about 25,000 cp and the fifth light zone is rather compact and has an intensity of around 8,000 cp, as indicated.

Figure 4A:
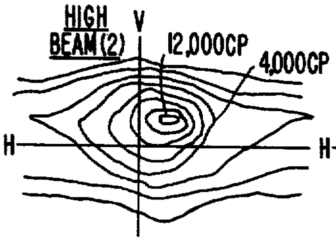
FIG.4A PRIOR ART

The high-beam pattern produced by each of the prior art dual-filament outboard lamps 18, 24 is shown in FIG. 4A and designated "High Beam (2)" to indicate that it relates to the lamps which contain two filaments. As will be noted, the central light zone has an intensity of approximately 12,000 cp and is located slightly to the right of the vertical axis V—V and slightly above the horizontal axis H—H. The fifth light zone has an intensity of about 4,000 cp and extends below the horizontal and to the left of the vertical axis, with the succeeding zones laterally spreading outwardly in both directions along the horizontal axis.

The beam pattern produced by each of the inboard single-filament high-beam headlamps 20, 22 of the FIG.

Figure 4B:
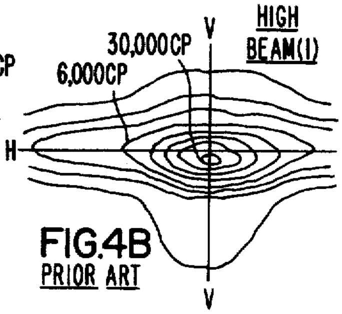
FIG.4B PRIOR ART

3 prior art system is shown in FIG. 4B and is designated "High Beam (1)", to indicate that only a single filament is involved. As will be noted, each of these lamps provides a more intense light beam that has its central light zone centered on the intersection of the horizontal and vertical axes and thus provides a very powerful beam of light that is aimed directly down the road in front of the vehicle and is designed to give maximum long-distance illumination of the roadway regardless of its intense glare and resulting blinding effect it has on other drivers. This is apparent from the fact that the central light zone typically has an intensity of approximately 30,000 cp and the fifth light zone an intensity of about 6,000 cp (as indicated), with the light being spread laterally in generally symmetrical fashion around the horizontal axis H—H.

In a typical 12 volt four-headlamp system, each of the low-beam filaments has a nominal rating of about 60 watts, the high-beam filaments in the dual-filament outboard lamps each has a nominal rating of about 37.5 watts, and the single high-beam filament in each of the inboard lamps also has a nominal rating of about 37.5 watts. The total power input for this prior art headlamp system is accordingly in the order of 120 watts for the low-beam mode and approximately 150 watts for the high-beam mode.

IMPROVED DUAL-HEADLAMP SINGLE-MODE SYSTEM (FIGS. 5 AND 6)

In contrast to the above-described conventional headlamp systems, the improved system of the present invention (shown in FIG. 5) employs a single pair of headlamps 32 and 34 that each contain a single on-focus light source, such as coiled filaments 33 and 35 of suitable refractory metal wire such as tungsten. Each of the headlamps consist of the usual paraboloidal reflector component and a light-controlling lens component (not shown) that are joined together along their peripheries and form a housing for the light source, in accordance with standard lamp-making practice.

Figure 5:
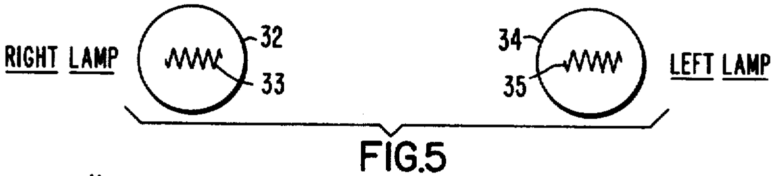
FIG. 5 is a schematic representation of the improved dual-headlamp system which embodies the present invention.

However, in contrast to the aforementioned conventional headlamp systems now in use, headlamps 32 and 34 of the improved system do not have identical beam patterns but are provided with lens components that produce beam patterns which are very different but complement one another, as hereinafter described. Hence, the headlamps are not interchangeable and must be mounted in the correct location on the front of the vehicle. Since the visual effect of the different beam patterns will be easier to understand if they are described from the point of view of the driver of the vehicle, the headlamp that is located on the left side of the vehicle (that is, the driver's left) will be designated the "left lamp" and the headlamp to the driver's right will be designated the "right lamp". If the headlamp system as illustrated in FIG. 5 constitutes a "head-on" view of the system (that is, one obtained from a point in front of the vehicle), then headlamp 32 would be the "right lamp" and headlamp 34 would be the "left lamp".

Since the headlamps of the improved system are not interchangeable, suitable means must be provided to distinguish the lamps from one another and ensure that they are properly installed on the vehicle. For example, key lugs of different shapes can be provided on the reflector portion of the headlamps which will fit into similarly-shaped mating recesses or slots in the fixture or part of the car in which the headlamps are mounted. Polarized socket-and-lamp-terminal combinations can also be used for this purpose, if desired.

Figure 6:
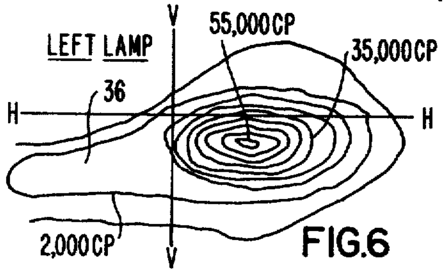
FIGS. 6 and 6A are isocandle diagrams of the individual beam patterns produced by the left and right headlamps employed in the improved vehicular roadway-lighting system shown in FIG. 5.
Figure 6A:
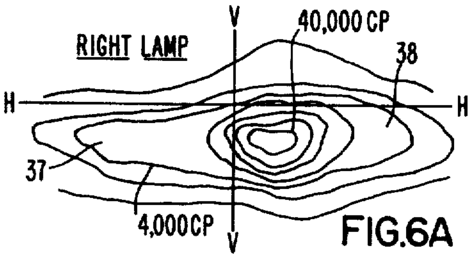

The beam patterns produced by the headlamps 32, 34 used in the improved roadway-lighting system are depicted in the isocandle diagrams shown in FIGS. 6 and 6A. The beam patterns are shown as they would appear to the driver of a vehicle having the "left headlamp" 34 on the driver's left and the "right headlamp" 32 on the driver's right.

As shown in FIG. 6, the "left lamp" 34 produces a beam pattern of high intensity that has a sharp horizontal cut-off, is centered to the right of the vertical axis V—V of the lamp and slightly below its horizontal axis H—H, and has a unique elongated light zone 36 of reduced intensity that extends beyond the vertical axis but is confined well below the horizontal axis. This protruding "tail" of low intensity light provides much needed illumination along the left edge or shoulder of the driving lane without producing glare light that would blind oncoming drivers. As indicated, the central light zone has an intensity in the order of approximately 55,000 cp and is located in the lower righthand quadrant below the horizontal axis. The adjacent light zones are more or less concentric with the central zone and are elongated in the direction of the horizontal axis—except the non-symmetrical zone or "tail" 36 and succeeding zones that are offset extend well to the left of the vertical axis. The intensity of the outer light zones decreases in a uniform manner but is still sufficient to provide good illumination far down the road in front of the vehicle, as indicated by the fact that the fifth light zone has an intensity of around 35,000 cp and the eighth light zone which defines the elongated "tail" 36 has an intensity of 2,000 cp or so.

The resulting beam pattern produced by the "left headlamp" 34 thus provides good visibility far down the roadway and along the left side of the roadway but does not produce glare light which would blind other drivers since the most intense portion of the light beam is depressed below the horizontal axis and located to the right of the vertical axis. This headlamp thus constitutes a "long-range" lamp which produces a powerful beam of light of the kind needed for safe driving at high speeds.

The beam pattern produced by the "right lamp" 32 is shown in FIG. 6A and is quite different and not as bright insofar as the central light zone is located closer but still to the right of the vertical axis V—V of the lamp and has an intensity of around 40,000 cp. In addition, a considerable portion of the light in this beam is spread laterally in both directions from the central intense zone to the left of the vertical axis and below the horizontal axis H—H, thus providing "fill-in" light down the roadway close to the vehicle and between the two high-intensity central zones produced by the headlamps, as well illuminating the right-hand edge or shoulder of the road to provide improved visibility of pedestrians, signs, etc., and when making right-hand turns. The pronounced lateral spread of the fifth light zone (4,000 cp), and resulting elongated "tails" 37 and 38 which it and the succeeding zones form, provide the aforementioned "fill-in" and peripheral lighting effects.

The "right headlamp" 32 thus also produces a light beam which is intense but depressed below the horizontal and is so configured and aimed that it provides "short range" illumination which complements the "long range" beam pattern of the "left lamp". The resulting composite beam is accordingly bright enough to provide adequate illumination of the central and both peripheral portions of the roadway at speeds up to 60 or 65 miles per hour and excellent visibility at the federally mandated speed limit of 55 miles per hour—with much less glare light than that produced by the high-beam patterns of the conventional dual-headlamp and four-headlamp systems now in use.

HEADLAMP EMBODIMENTS (FIGS. 7-8)

Figure 7:
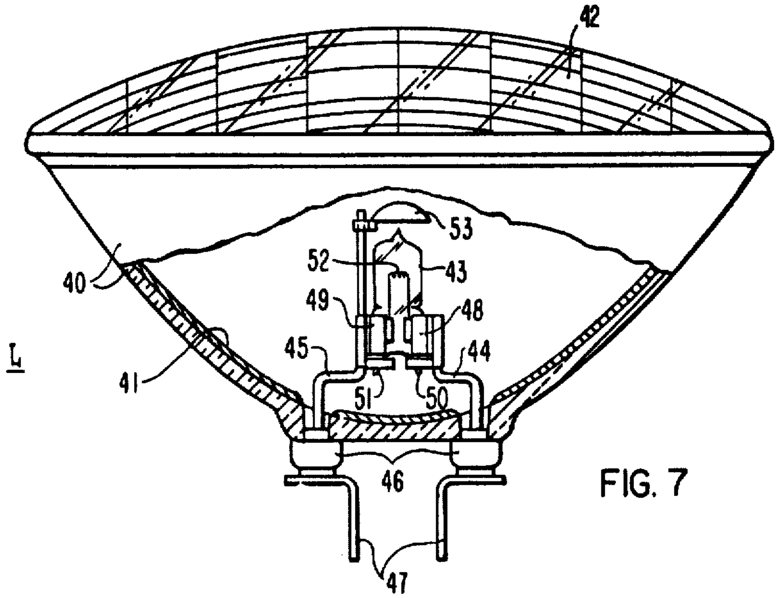
FIG. 7 is a side elevational view, partly in section, of a representative sealed-beam type headlamp which is employed in the improved lighting system of the present invention and contains a compact halogen-cycle incandescent lamp as the light source.

The headlamps employed in the improved headlighting system of the present invention are preferably of sealed-beam construction and contain either a compact halogen-cycle incandescent lamp or a coiled tungsten-wire filament. The headlamp L shown in FIG. 7 is of the halogen-cycle type and accordingly consists of a paraboloidal reflector component 40 that is molded from glass and has a specular film 41 of aluminum or similar reflective metal deposited on its inner surface. A suitable glass lens component 42 is sealed along its periphery to the glass reflector component and is so shaped that it provides a series of light-bending flutes or facets 48 on its inner surface that are contoured and arranged to bend the light rays in the proper manner to provide the aforementioned beam patterns.

A compact tungsten-halogen lamp 43 is supported within the reflector component 40 by a pair of main lead wires 44, 45 that extend through suitable openings in the reflector and are electrically joined, as by brazing, to a pair of metal ferrules 46 that are hermetically sealed to bosses provided on the of the reflector. L-shaped metal terminals 47 are fastened to the respective ferrules to provide a blade-like connector that is adapted to be inserted into a suitable socket of the vehicle's electrical system. The housing or envelope formed by the sealed reflector and lens components is evacuated and filled with a suitable inert atmosphere, such as nitrogen, through a tubulation (not shown) in the usual fashion and the tubulation is then tipped off.

The halogen incandescent lamp 43 is secured to the main lead wires 44, 45 by sheet metal clips 48, 49 that are slipped over the sides of the press seal and fastened to the respective lead wires. The lamp leads 50, 51 are fastened to tabs at the ends of the metal clips to complete the circuit and permit the lamp filament 52 to be energized. The halogen-cycle lamp 43 is positioned so that its coiled filament 52 is substantially coincident with the focal point of the paraboloidal glass reflector component 40.

In order to prevent light rays from passing directly from the halogen-cycle lamp 43 through the lens component 42 and producing glare light, a suitable shield 53 of sheet metal or the like is preferably suspended in front of and in masking relationship with the filament 52 by a strap that extends from the shield and is fastened, as by spot-welding, to an extension of one of the main lead wires 45, as shown in FIG. 7.

Figure 8:
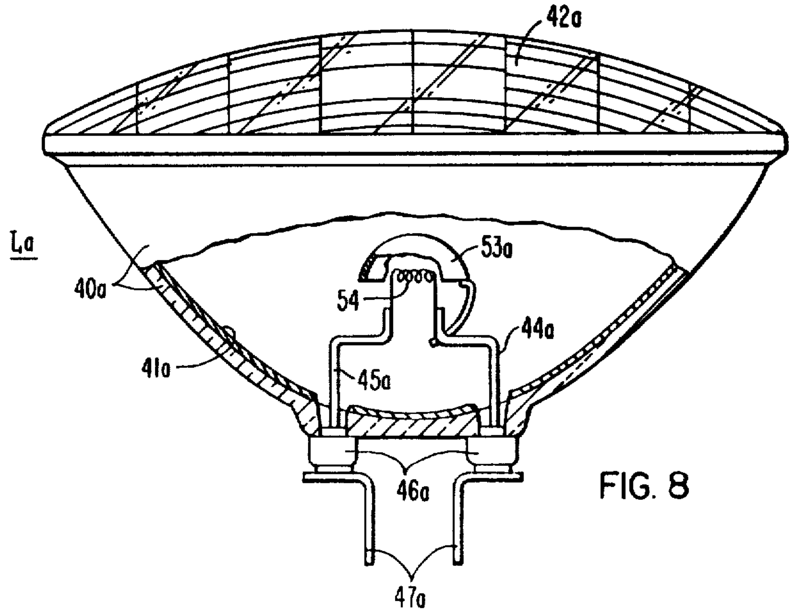
FIG. 8 is a similar view of an alternative sealed-beam headlamp that employs a bare filament coil as the light source and can also be used in the improved lighting system of the present invention.

Alternatively, the light source can comprise a coiled tungsten-wire filament 54 (as illustrated in FIG. 8) that is held within the hermetically-sealed envelope of a headlamp La by securing the filament legs to the ends of the main lead wires 44*a*, 45*a* which are fastened to the metal ferrules 46*a* of the reflector component 40*a*. As in the previous embodiment, the filament 54 is located at the focal point of the paraboloidal reflector and a metal shield 53*a* is attached to one of the main leads 44*a* to intercept direct light rays and prevent glare. The sealed envelope formed by the joined glass lens 42*a* and reflector component 40*a*, in this case, is filled with a mixture of nitrogen and argon at a suitable pressure to prevent filament oxidation. The lens 42*a* is also provided with a series of facets 48*a* which direct the light rays into the desired beam pattern.

If desired, the headlamps can also be manufactured in a manner such that the lens can be removed from the reflector component to provide a housing which is not hermetically sealed and can thus be dismantled to permit the halogen-cycle lamp (or conventional type incandescent lamp) to be replaced. Lamp replacement can also be effected by suitably designing the terminal assembly of the headlamp in such a way that it can be removed from the reflector and then reinserted, in which case the lens and reflector components can be permanently joined to one another.

As will also be apparent to those skilled in the art, the headlamps can be of circular or rectangular shape by properly forming the reflector and lens components so that their peripheries have the desired configuration. If circular-shaped headlamps are used, they can be of the PAR 56 type (17.78 cms. diameter). A suitable size for rectangular-shaped headlamps is 10.16 cms. by 16.5 cms.

Since only one filament is used in each of the headlamps 32, 34 of the improved headlighting system and it is positioned at the focal point of the reflector, beam patterns having light intensities of the magnitude mentioned above can be achieved in 12 volt electrical systems with total power inputs in the order of 100 to 120 watts (approximately 50 to 60 watts per lamp). Due to the higher efficiencies obtained with halogen-cycle type incandescent lamps, comparable beam intensities can probably be achieved with headlamps using such halogen light sources and a total power input in the order of 70 to 100 watts or so in a 12 volt system (from about 35 watts to about 50 watts per halogen-cycle lamp).

In countries such as England and Japan where cars are driven on the left side of the road rather than on the right side, then the lens components of the "left hand" and "right hand" headlamps of the improved system as above-described will of course be transposed and the optical prescriptions of the lenses reversed in order to provide the proper individual and composite beam patterns (that is, beam patterns wherein the depressed "tail" of light 36 extends to the right of the vertical axis and constitutes a part of the beam pattern which is produced by the "right lamp" instead of the "left lamp", etc.).

PROTOTYPE LENS PRESCRIPTIONS (FIGS. 9-9A)

Figure 9:
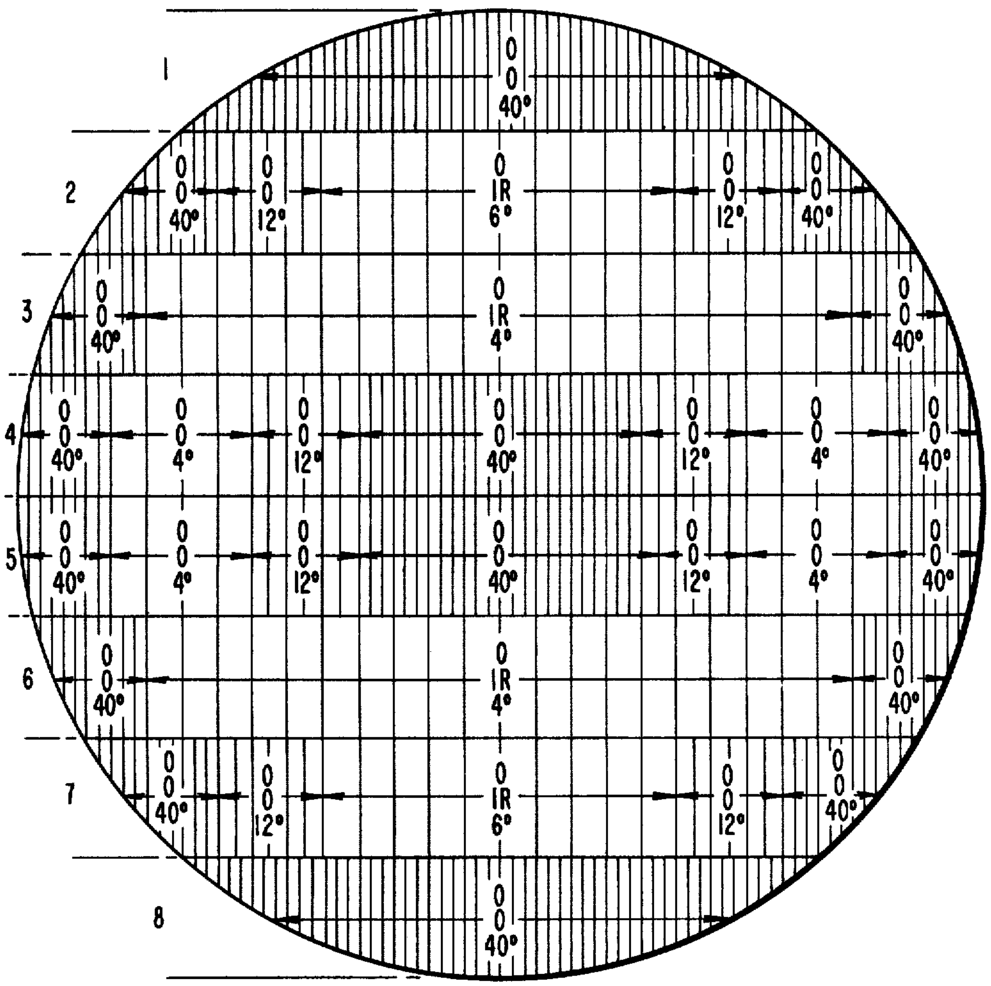
FIGS. 9 and 9A are plan views of prototype lenses for the left and right head lamps, respectively, of the improved system showing the optical prescriptions for the various groups of flutes or facets.
Figure 9A:
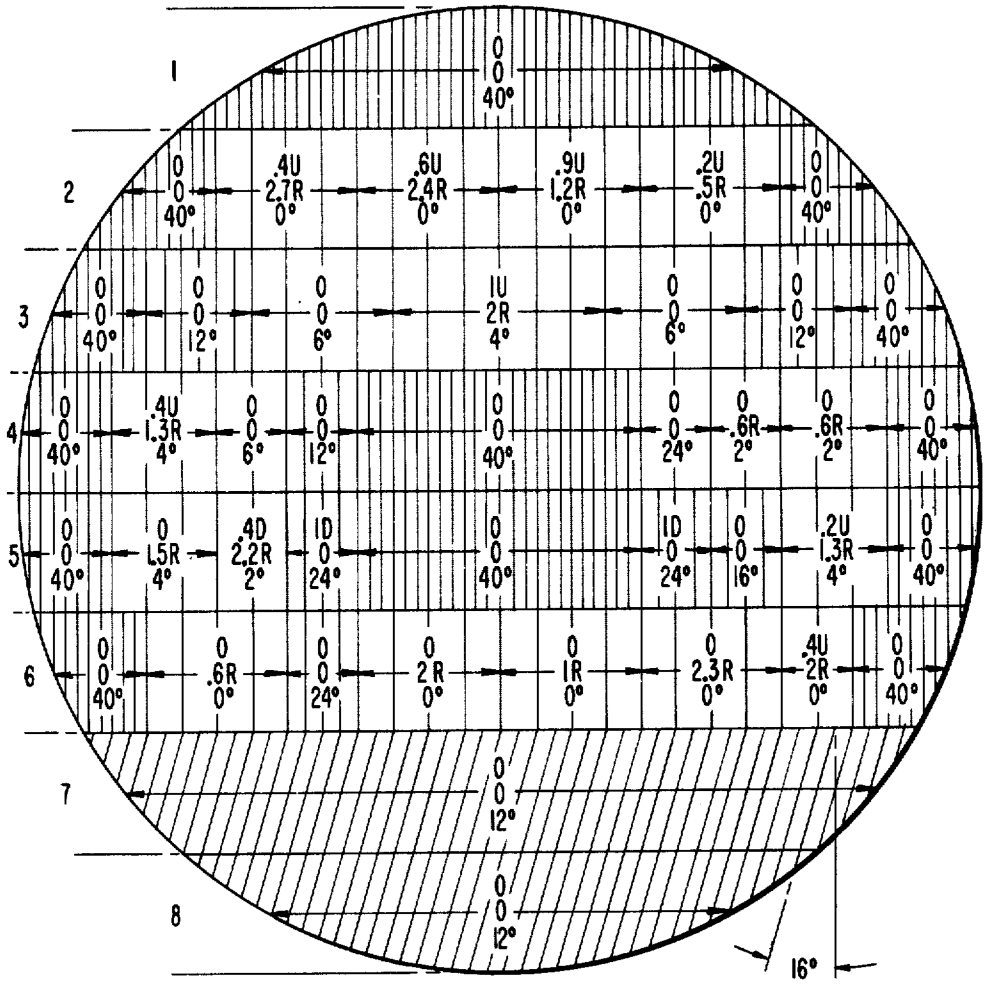

As a specific example of lens components for the "left" and "right" headlamps of the improved roadway-lighting system of the present invention, there is shown in FIGS. 9 and 9A prototype lenses for the respective lamps. The lenses are press-molded from suitable glass and are shown in plan view with their smooth convex surfaces facing outwardly (as though the lenses were part of finished headlamps) so that the rows of flutes or facets are located on the concave inward surfaces of the lenses. The optical characteristics of the various facets are given numerically in the form of groups of three vertically-arranged numbers, in accordance with the practice of those skilled in the art. The top number of each group indicates the number of degrees a light ray passing through the facet would be tilted either upwardly or downwardly. The middle number indicates the number of degrees such a light ray would be tilted or redirected in a lateral direction (R for right tilt and L for left tilt). The bottom number indicates the number of degrees the light ray is spread laterally.

Thus, the top and bottom rows of facets for the prototype lens of the "left headlamp" (rows Nos. 1 and 8 in FIG. 9) produce a zero degree up/down tilt, a zero degree left/right tilt, and a 40° lateral spreading of the light rays.

The facets in the center of row No. 3 of the prototype lens for the "right headlamp" (FIG. 9A), in contrast, produce a 1° upward (U) tilt, a 2° right (R) tilt, and a 4° lateral spreading of light rays which pass through this particular group of facets.

The "biased" or skewed facets along the bottom of the prototype lens for the "right headlamp" (rows Nos. 7 and 8 of FIG. 9A) are unique in that they provide light above the horizontal and to the right of the vertical (V—V) axis of the headlamp at a certain angle which is determined by the optical prescription of the facets.

For those skilled in the art, the numerically-coded prescriptions for the various facets given in FIGS. 9 and 9A provide sufficient information to enable them to manufacture the respective lenses since the specified optical data can readily be translated by available conversion tables into the tool-making data necessary to make properly contoured molds which would press molten quantities of glass into lens components having the required faceted surfaces.

BEAM PATTERNS PRODUCED BY PROTOTYPE LAMP LENSES (FIGS. 10—10A)

Figure 10:
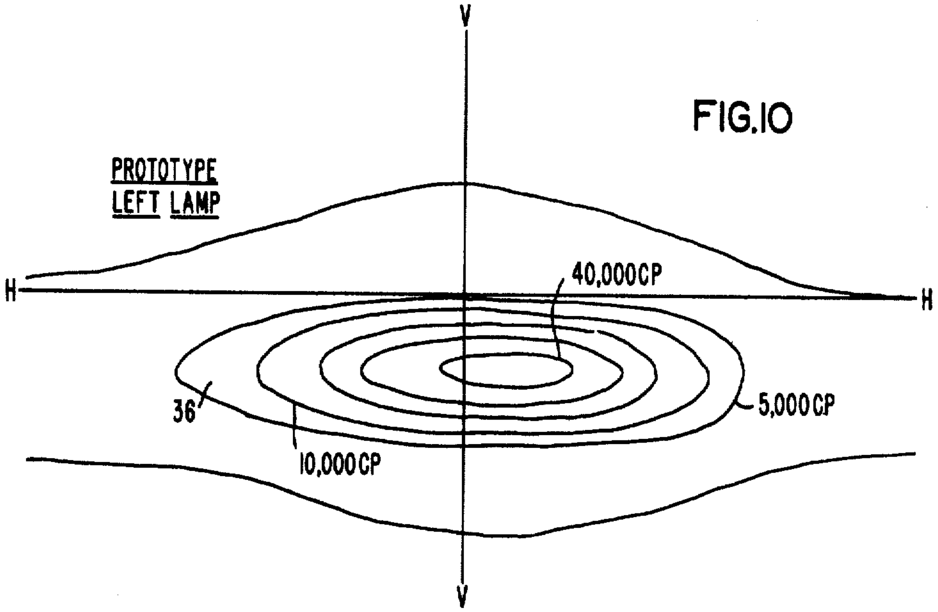
FIGS. 10 and 10A are isocandle diagrams illustrating the beam patterns produced by experimental left and right headlamps, respectively, made with the prototype lenses shown in FIGS. 9 and 9A.
Figure 10A:
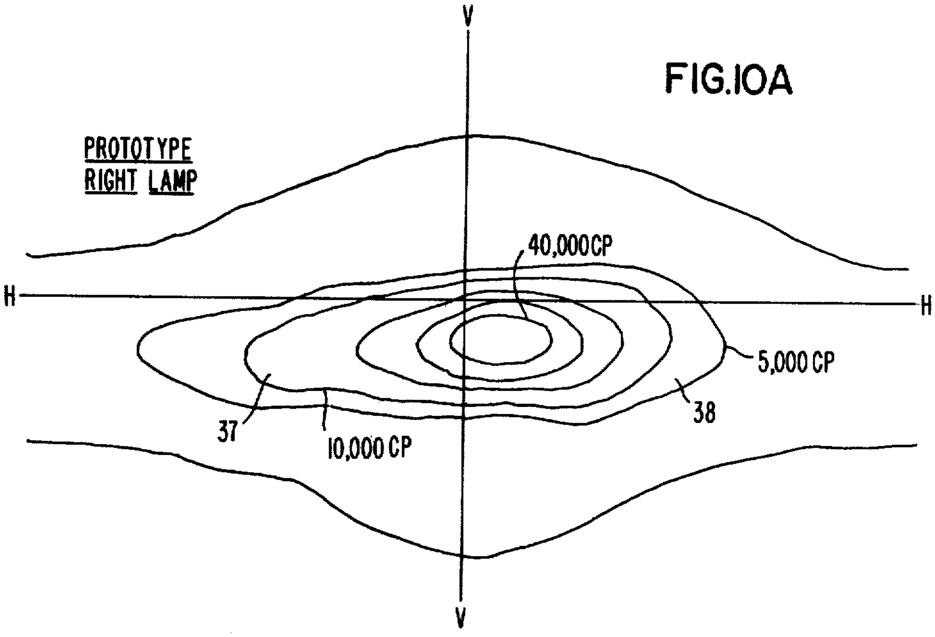

The beam patterns produced by experimental headlamps made with the FIGS. 9 and 9A prototype lenses are shown in FIGS. 10 and 10A.

As will be noted, the beam pattern of the experimental "right headlamp" (FIG. 10A) is very close to the optimum pattern for this lamp (shown in FIG. 6A) except that the 40,000 cp central zone straddles the vertical axis V—V instead of being located to the right of this axis. A sharper horizontal cut-off and a more pronounced lateral spreading of the light to the right would also be desirable.

The experimental "left headlamp" had a beam pattern (FIG. 10) which was also different in some respects from the optimum pattern for this lamp (shown in FIG. 6). For example, the intensity (40,000 cp) for the central zone is too low and this zone should also be located closer to the horizontal and to the right of the vertical axis. A stronger concentration of light to the left of the vertical below the horizontal axis is also required.

MODIFIED PROTOTYPE LENS PRESCRIPTIONS (FIGS. 11-11A)

Figure 11:
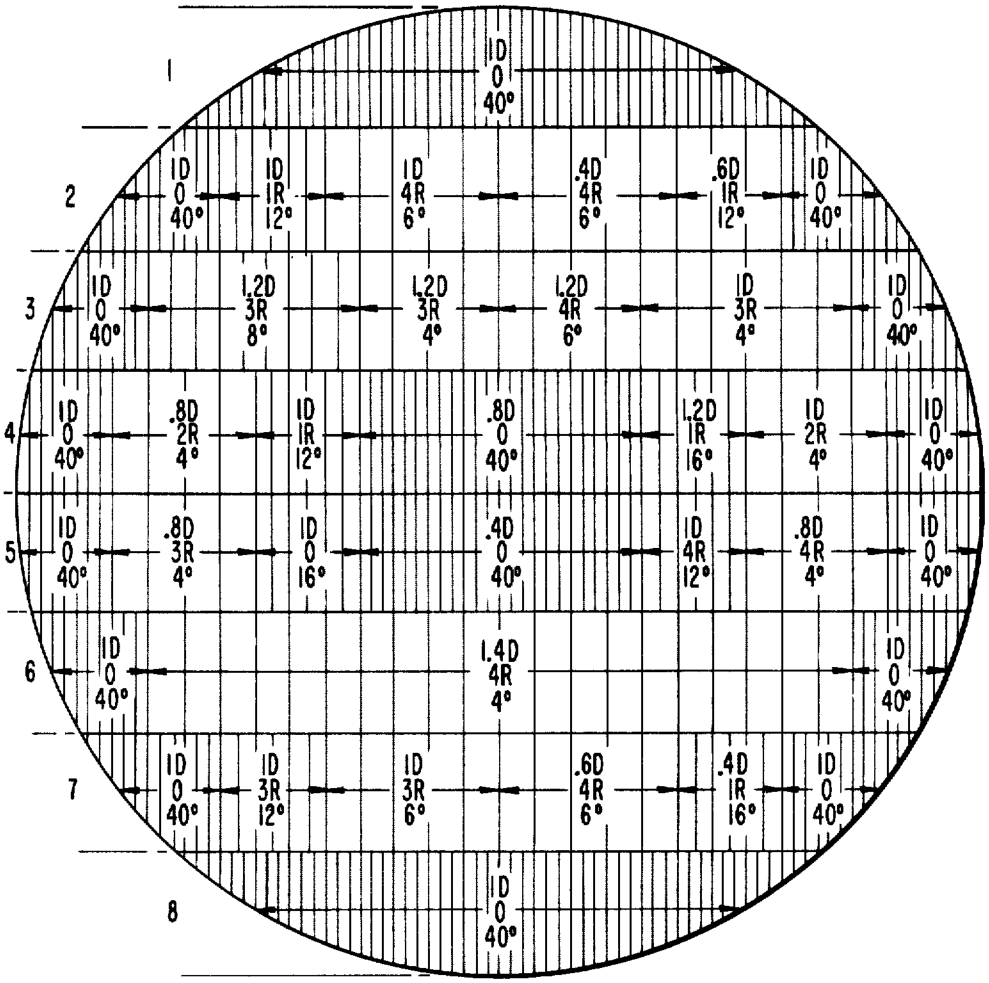
FIGS. 11 and 11A are plan views of another set of prototype lenses for left and right headlamps, respectively, having modified optical prescriptions for the lens facets which will provide beam patterns that will more closely conform to the optimum beam patterns shown in FIGS. 6 and 6A.
Figure 11A:
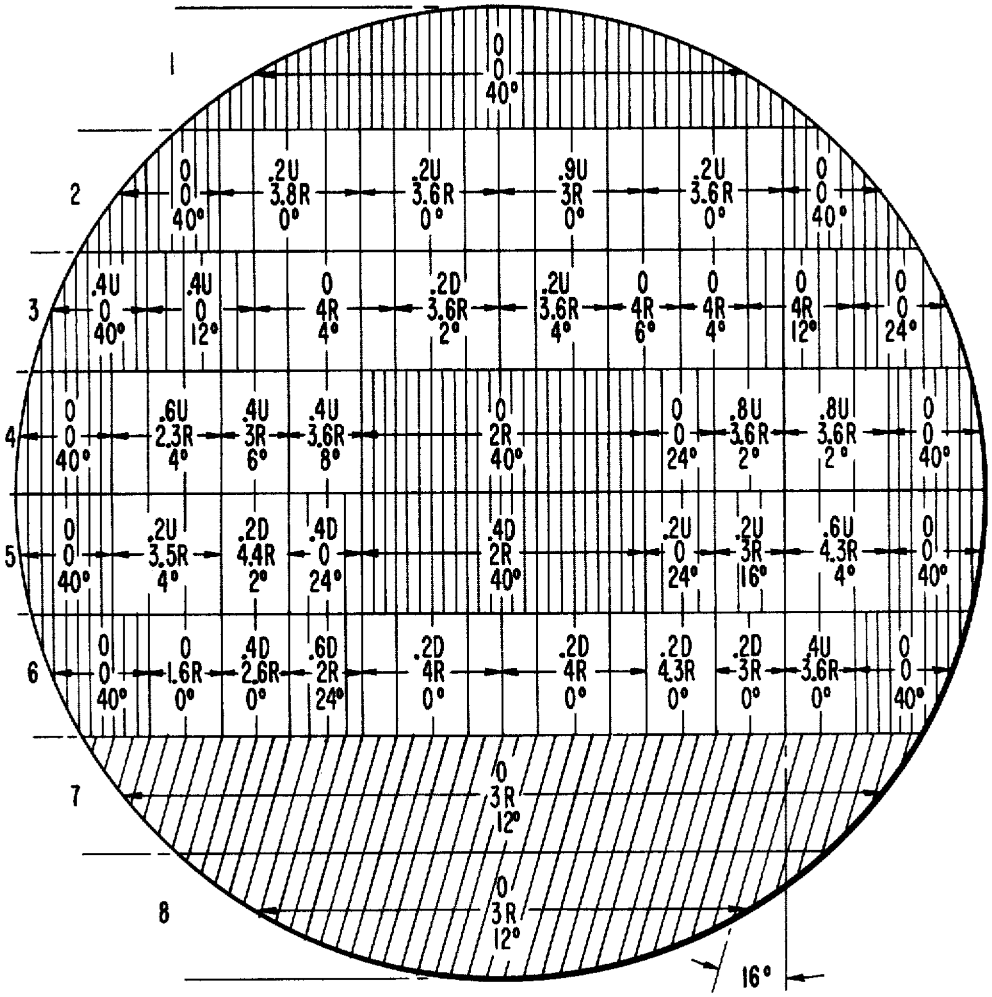

On the basis of the beam patterns produced by the prototype lenses shown in FIGS. 9 and 9A, various corrections were made in the lens prescriptions to rectify the deficiencies in light concentration and distribution. The modified prototype lens prescriptions for the "left" and "right" headlamps are shown in FIGS. 11 and 11A, respectively.

As will be noted, the various facets of the modified prototype lens for the "left headlamp" (FIG. 11) have prescriptions which will effect more downward tilting and more divergence to the right of the transmitted light rays. The modified lens prescription for the "right headlamp" (FIG. 11A) also has been modified to provide a more "downward" tilt of the light rays and more light to the right of the vertical axis.

While the modified prototype lenses have not actually been made and tested in actual lamps, it is believed that they will produce beam patterns which will conform closely to the optimum beam patterns shown in FIGS. 6 and 6A.

If desired, a dual-segment reflector of the type described in U.S. Pat. No. 3,688,149 to E. Pitkjaan (one of the present joint inventors) can be used in one or both headlamps of the improved single-mode systems since this would facilitate obtaining the "steep" distribution of the light intensity required for the sharp horizontal and vertical cutoff boundaries in the respective beam patterns. The teachings of the aforesaid Pitkjaan U.S. Pat. No. 3,688,149 are accordingly incorporated herein by reference for the construction and operational features of such dual-segment headlamp reflectors.

In addition to inner shields to intercept direct glare light rays from the filaments the "left" and "right" headlamps can also be provided with a predetermined downward tilt (2°, for example) of their optical axes relative to their mechanical axes in order to reduce glare light.

We claim as our invention:

1. A roadway lighting system for a motor vehicle comprising, in combination;

a single pair of headlamps mounted on the front of the vehicle and on opposite sides of its centerline so that one of said headlamps constitutes a left headlamp and the remaining headlamp a right headlamp, relative to the position of the operator of the vehicle, a single light source within each of said headlamps, and means for energizing said headlamps including a switch for operating and de-activating the light sources in unison and thereby providing a single mode of roadway illumination that is used for all driving conditions, each of said headlamps having a reflector component and a lens component that define a housing and direct the light rays generated by the associated light sources into a light beam of controlled intensity and configuration, said lens components having different light-modifying characteristics that are adapted to provide different beam patterns which complement one another, (a) the left headlamp having a lens component such that the left headlamp produces a beam pattern which has a sharp horizontal cut-off, a concentrated region of maximum light intensity that is located substantially below the horizontal axis and to the right of the vertical axis, and additional regions of light that surround the maximum light intensity region and together therewith provides long range illumination of the roadway in front of the vehicle, (b) the right headlamp having a lens component such that the right headlamp produces a beam pattern which includes a concentrated region of maximum light intensity that is also located substantially below the horizontal axis and to the right of the vertical axis and merges with additional surrounding regions of light that extend laterally and thereby provide short range illumination of the roadway as well as fill-in illumination for the center of the driving lane between the two maximum-intensity light regions, the beam intensity of the right headlamp being less than that of the left headlamp.

2. The vehicular roadway-lighting system of claim 1 wherein each of said headlamps also contains a shield that is disposed in front of and in masking relationship with the associated light source.

3. The vehicular roadway-lighting system of claim 1 wherein the lens component of at least one of said headlamps is removably secured to the associated reflector component and provides a housing for the associated light source which is closed but not hermetically or permanently sealed.

4. The vehicular roadway-lighting system of claim 3 wherein;

each of said headlamps is of the non-hermetic sealed type, and each of the light sources in said headlamp comprises a compact halogen-incandescent lamp.

5. The vehicular roadway-lighting system of claim 1 wherein each of the reflector components is hermetically secured to the associated lens component and both of said headlamps are thus of the sealed beam type.

6. The vehicular roadway-lighting system of claim 5 wherein each of said light sources comprises a coiled filament of refractory metal wire.

7. The vehicular roadway-lighting system of claim 5 wherein each of said light sources comprises a compact tungsten-halogen incandescent lamp.

8. The vehicular roadway-lighting system of claim 1 wherein;

each of said reflector components is of paraboloidal configuration, each of said light sources is substantially disposed at the focal point of the associated paraboloidal reflector component, the beam pattern produced by the left headlamp includes an elongated region of less intense light that extends to the left of the maximum-intensity region and beyond the vertical axis of the headlamp and thus provides illumination for left-hand turns by the vehicle, and the said additional surrounding regions of light in the beam pattern of the right headlamp are elongated laterally in each direction from the maximum-intensity region of light and thus provide illumination to the right of the vehicle and improved visibility of the right-hand periphery of the driving lane in addition to the fill-in and short range illumination.

9. The vehicular roadway-lighting system of claim 8 wherein each of said light sources is masked by a shield means that is supported at a location relative to the light source and the associated lens component that it intercepts light rays from the light source that would otherwise pass directly through the lens component.

10. The vehicular roadway-lighting system of claim 9 wherein the peripheral portions of said reflector and lens components are of rectangular configuration.

11. The vehicular roadway-lighting system of claim 9 wherein the peripheral portions of said lens and reflector components are of circular configuration.

12. The vehicular roadway-lighting system of claim 9 wherein each of said light sources comprises a compact tungsten-halogen incandescent lamp of tubular configuration.

13. The vehicular roadway-lighting system of claim 12 wherein each of said headlamps has a nominal rating of from about 35 watts to about 50 watts.

14. The vehicular roadway-lighting system of claim 9 wherein;

said paraboloidal reflector components are composed of vitreous material that is coated with a specular film of metal, and said lens components are also composed of vitreous material and are hermetically joined to the respective reflector components so that said headlamps are of the sealed beam type.

15. The vehicular roadway-lighting system of claim 14 wherein each of said light sources comprises a filament of coiled refractory wire.

16. The vehicular roadway-lighting system of claim 15 wherein each of said headlamps has a nominal rating of from about 50 watts to about 60 watts.

17. The vehicular roadway-lighting system of claim 1, 3, 5 or 9 wherein one or both of the reflector components are of dual-segment construction and have an inner surface which defines a pair of hemiparabolic reflector segments that are offset from one another in an axial direction and also merge with one another along a step that extends horizontally across the reflector when the headlamp is oriented in its position of use on the motor vehicle.

* * * * *